United States Patent [19]

Leitgeb et al.

[11] Patent Number: 5,051,115
[45] Date of Patent: Sep. 24, 1991

[54] PRESSURE SWING ADSORPTION PROCESS

[75] Inventors: Paul Leitgeb, Pullach; Johann Leis, Neufahrn, both of Fed. Rep. of Germany

[73] Assignee: Linde Aktiengesellschaft, Wiesbaden, Fed. Rep. of Germany

[21] Appl. No.: 51,563

[22] Filed: May 20, 1987

[30] Foreign Application Priority Data

May 21, 1986 [DE] Fed. Rep. of Germany ....... 3616981
May 21, 1986 [DE] Fed. Rep. of Germany ....... 3617036

[51] Int. Cl.$^5$ ............................................. B01D 53/04
[52] U.S. Cl. .......................................... 55/26; 55/58; 55/62; 55/68
[58] Field of Search ................... 55/25, 26, 31, 33, 35, 55/58, 62, 68, 74, 75

[56] References Cited

U.S. PATENT DOCUMENTS

| | | | |
|---|---|---|---|
| 3,176,444 | 4/1965 | Kiyonaga | 55/26 |
| 3,430,418 | 3/1969 | Wagner | 55/62 X |
| 3,564,816 | 2/1971 | Batta | 55/62 X |
| 3,636,679 | 1/1972 | Batta | 55/62 X |
| 3,717,974 | 2/1973 | Batta | 55/58 |
| 3,738,087 | 6/1973 | McCombs | 55/58 |
| 3,923,477 | 12/1975 | Armond et al. | 55/25 |
| 3,977,845 | 8/1976 | Walter | 55/25 |
| 4,171,207 | 10/1979 | Sircar | 55/26 |
| 4,280,824 | 7/1981 | Lassmann et al. | 55/26 |
| 4,299,596 | 11/1981 | Benkmann | 55/26 |
| 4,371,380 | 2/1983 | Benkmann | 55/26 |
| 4,376,639 | 3/1983 | Vo | 55/26 |
| 4,402,712 | 9/1983 | Benkmann | 55/26 |
| 4,440,548 | 4/1984 | Hill | 55/26 |
| 4,468,238 | 8/1984 | Matsui et al. | 55/26 |
| 4,512,780 | 4/1985 | Fuderer | 55/26 |
| 4,548,799 | 10/1985 | Knoblauch et al. | 55/25 X |
| 4,578,089 | 3/1986 | Richter et al. | 55/26 |
| 4,599,094 | 7/1986 | Werner et al. | 55/26 |
| 4,705,541 | 11/1987 | Sircar | 55/26 |
| 4,717,397 | 1/1988 | Wiessner et al. | 55/26 |
| 4,726,816 | 2/1988 | Fuderer | 55/26 |

Primary Examiner—Robert Spitzer
Attorney, Agent, or Firm—Millen, White & Zelano

[57] ABSTRACT

In a pressure swing adsorption process, after the adsorption phase, the residual less adsorbable components are purged by the introduction of a gas consisting essentially of the more adsorbable component. The more adsorbable component is subsequently recovered by drawing a vacuum on the adsorber. When separating a gaseous mixture containing 40-75 mol % of the more adsorbable component, after a vacuum recovery step to 0.03-0.3 bar, a first pressure buildup phase is performed with a gas consisting essentially of less adsorbable components. Preferably, the gas is an unadsorbed gas exiting during the adsorption phase from another adsorber. The gas employed in the first pressure build up is introduced into the adsorber countercurrently to the adsorption direction until an intermediate pressure of 0.1-1 bar is reached. A further pressure buildup is then conducted, preferably with expansion gas from another adsorber and/or with the gaseous mixture to be separated.

20 Claims, 1 Drawing Sheet

PRESSURE SWING ADSORPTION PROCESS

BACKGROUND OF THE INVENTION

1. Field of the Invention

This invention relates in general to an improved pressure swing adsorption (PSA) process for the separation of a gaseous mixture containing at least two components having different adsorbabilities, and especially to an improved version of a prior art process.

2. Prior Art

In DOS 26 04 305, the gaseous mixture to be separated is conducted in an adsorption phase through an adsorber and, during this step, a more adsorbable component is bound to an adsorbent. The less adsorbable components that remain in the adsorber after the adsorption phase are purged by introducing a gas consisting essentially of the more adsorbable component. Then, the more adsorbable component is recovered by lowering the pressure in the adsorber to subatmospheric pressure. The adsorber is then repressurized to adsorption pressure in order to repeat the cycle.

In the precedingly described process, it is desired to obtain adsorbable as well as unadsorbable components in as pure a concentration as technically feasible. To achieve this objective, adsorption is performed in two series-connected adsorbers, with the above-indicated process steps being conducted in the first adsorber to obtain the adsorbable component as pure product gas, while, in the subsequently connected, second adsorber, a further purification of the unadsorbable component is conducted.

The use of the known process is advantageous in the separation of gaseous mixtures from which an adsorbable component is to be obtained as the product stream and which furthermore contains a relatively large proportion of an unadsorbable component which is likewise to be obtained as the product gas. However, there is the drawback that a fraction of the adsorbable component enters the second adsorber from which it is not recovered as a product stream, thereby resulting in a reduced yield. The economic significance of this unfavorable effect is proportional to the concentration of the adsorbable component in the gaseous mixture to be separated, i.e. the higher the concentration, the higher the loss.

If one were to apply the prior art process to recover only the adsorbable component as a product stream, it would be obvious to eliminate the subsequently connected adsorber. However, this would still not remedy the unsatisfactory yield in adsorbable component.

SUMMARY

An object of this invention is to provide an improved PSA process, especially an improved process of the type discussed above so that the losses in yield of the adsorbable component will be reduced.

Upon further study of the specification and appended claims, further objects and advantages of this invention will become apparent to those skilled in the art.

This invention is particularly advantageous for the separation of gaseous mixture having a content of at least 40 mol%, more generally in the range of 40-75 mol%, preferably 50-70 mol% of the more adsorbable component.

The improved process comprises applying a vacuum to the adsorber, preferably to a pressure of 0.03-0.3 bar, and repressurizing the adsorber in a first pressure buildup phase with a weakly adsorbable gas, e.g. a foreign gas or preferably the unadsorbed gas exiting from an adsorber during an adsorption phase, said repressurization gas being introduced into the adsorber preferably countercurrently to the adsorption direction, until an intermediate pressure has been reached, preferably in the range 0.1-1 bar, further repressurizing the adsorber with a gas different from said weakly adsorbable gas, e.g. expansion gas from another adsorber and/or with gaseous mixture to be separated.

In pressure swing adsorption processes of the above type, the repressurizing of an adsorber, after vacuum desorption, to the adsorption pressure was heretofore conducted conventionally by introducing either (a) expansion gas from another adsorber or (b) the gaseous mixture to be separated. Without being bound by an explanation of this invention, the process of this invention is based on the premise that, in conventional processes, the formation of the mass transfer zone in the adsorber during pressurization is deleteriously affected in cases of high concentrations of the adsorbable component in the gaseous mixture. The mass transfer zone, also called adsorption front, acts as a dividing layer in the adsorber between the zone not loaded with adsorbable component from the zone loaded with equilibrium concentration of adsorbable component. The thinner this mass transfer layer, the greater the load that can be placed on an adsorber before the adsorbable component is discharged together with unadsorbable component from the adsorber outlet end. A wider adsorption front, in contrast, has the result that either the adsorbent cannot be satisfactorily utilized, or that, during an adsorption phase, the relatively strongly adsorbable component is withdrawn from the adsorber outlet in increasing concentration, which results directly in losses of yield.

It has been found surprisingly that an undesired form of the mass transfer zone in the adsorber can be prevented, if, before the usual pressurizing by expansion gas, or gaseous mixture to be separated, a first pressure buildup is conducted to an intermediate pressure of between 0.1 and 1 bar, preferably between 0.1 and 0.5 bar, with unadsorbed gas exiting from an adsorber. As a less preferred alternative to the use of unadsorbed gas, any gas foreign to the process can, in principle, be used so long as it has a relatively weak adsorbability as compared with the adsorbable component. For example, if carbon monoxide is to be adsorbed from a gaseous mixture and is to be obtained as a product stream, then a suitable foreign gas is, for example, nitrogen or preferably, if available, a gas of even weaker adsorbability, such as hydrogen, argon, etc. To reach the desired intermediate pressures, the pressure in the adsorber, is increased by an increment of at least 0.1, especially at least 0.9, and more preferably at least 0.4 bar over the pressure prevailing in the adsorber prior to this step.

By creating a more favorable form of the mass transfer zone in the adsorber, a discernible improvement in yield is obtained for the adsorbable component. In the recovery of carbon monoxide from waste gases, the yield can be raised, for example, from about 75% to more than 90%.

The process of this invention is especially suitable in the recovery of an adsorbable component from a gaseous mixture wherein this component is contained in certain concentrations. A lower limit of 40 mol% and preferably 50 mol% of the adsorbable component in the gaseous mixture is important insofar as gases with such high proportions of adsorbable components can be separated only with a relatively low yield if the first pressure buildup takes place, rather than in accordance with this invention, in the conventional way by the introduction of expansion gas or of gaseous mixture to be separated. Nevertheless, the process of this invention still provides high yields even at relatively low concentrations, but those yields are then no longer so markedly different from the yields attainable according to the conventional processes that the use of the additional measures may not be economically attractive. Conversely, an upper limit of 75 mol% and, preferably 70 mol% is important because in those gaseous mixtures enriched to an even greater extent with adsorbable components, the measures provided according to this invention are no longer sufficient in and of themselves for ensuring a high yield of, for example, above 80%, preferably of above 90%. Thus, while this invention, under present economic circumstances, has particular application to the separation of gaseous mixtures having certain concentrations of strongly adsorbable gases, the invention taken as a whole constitutes an unobvious departure from the prior art, and is not intended to be limited to the separation of such gaseous mixtures.

In an advantageous embodiment of the adsorption process according to this invention, another step is provided after termination of an adsorption phase and before the purging of less adsorbable components that have remained in the adsorber. This intervening step comprises expanding the adsorber to an intermediate pressure which should not drop below the partial pressure of the more adsorbable component in the gaseous mixture to be separated. The intermediate pressure is preferably close to the partial pressure of the more adsorbable component, especially in the range of 0.1 to 0.5 bar, particularly 0.1 to 0.2 bar above said partial pressure. If the pressure value falls below this range, then an increased desorption of the more adsorbable component is to be expected during this expansion phase which, in the final analysis, diminishes the yield attainable. In this context "partial pressure" means the partial pressure of the strongly adsorbable component during adsorption. This partial pressure is defined by the adsorption pressure and the concentration of the strongly adsorbable component in the gaseous mixture.

The expansion gas exiting from the adsorber during the intervening expansion phase and consisting essentially of less adsorbable components can be utilized advantageously for the repressurization (i.e. pressure buildup) of another, previously regenerated adsorber. By "consisting essentially of" in this context is meant that the expansion gas contains generally about at least 50 mol% , preferably at least 80 mol% and especially at least 90 mol% of the less adsorbable components.

In a further advantageous embodiment of the process of this invention, the gas leaving the adsorber during the purging of the latter with a gas consisting essentially of more adsorbable components (e.g. a gas containing at least 95 mol%, preferably at least 99 mol% of the more adsorbable component) is introduced into another, previously regenerated adsorber. The gas exiting from the adsorber during this purging phase contains a considerable proportion, e.g., about 10 to 90 mol%, especially about 20 to 60 mol% of the more adsorbable component, and this adsorbable component can be recovered by recycling the exit gas into another adsorber, during which step an initial loading of the adsorber receiving this gas simultaneously takes place.

The adsorption pressure to be maintained in the process of this invention can vary within wide ranges and is dependent especially on the type of gaseous mixture to be separated and on the adsorbent utilized. The particular pressure is selected in a conventional manner, based on the adsorption isotherm prevailing at the adsorption temperature. In many cases, for example when recovering carbon monoxide from mixtures with less adsorbable components, such as, for example, hydrogen and/or nitrogen, it is advantageous to perform the adsorption under a pressure of between 1 and 5 bar, preferably between 1.5 and 3 bar.

In the vacuum desorption of the adsorber, a pressure is reached during this step of preferably 0.1-0.2 bar.

The process of this invention is not restricted to the separation of a specific gaseous mixture. It is, however, especially suited for separating a gas rich in carbon monoxide, as obtained, for example, in metallurgical plants, said gases containing, in addition to carbon monoxide, the components nitrogen, hydrogen and carbon dioxide. In the separation of such a gas, though, the most adsorbable component, carbon dioxide, should be separated beforehand; this can be done, for example, in an upstream PSA installation. A typical $CO_2$-separated gas amenable to treatment by the present invention is composed of 10 to 80 mol% carbon monoxide, 90 to 20 mol%, nitrogen and/or 0 to 90 mol% hydrogen.

BRIEF DESCRIPTION OF THE DRAWINGS

Additional details of the invention will be described below with reference to the preferred embodiment schematically illustrated in the figures wherein.

DETAILED DESCRIPTION OF THE DRAWINGS

Figure 1:
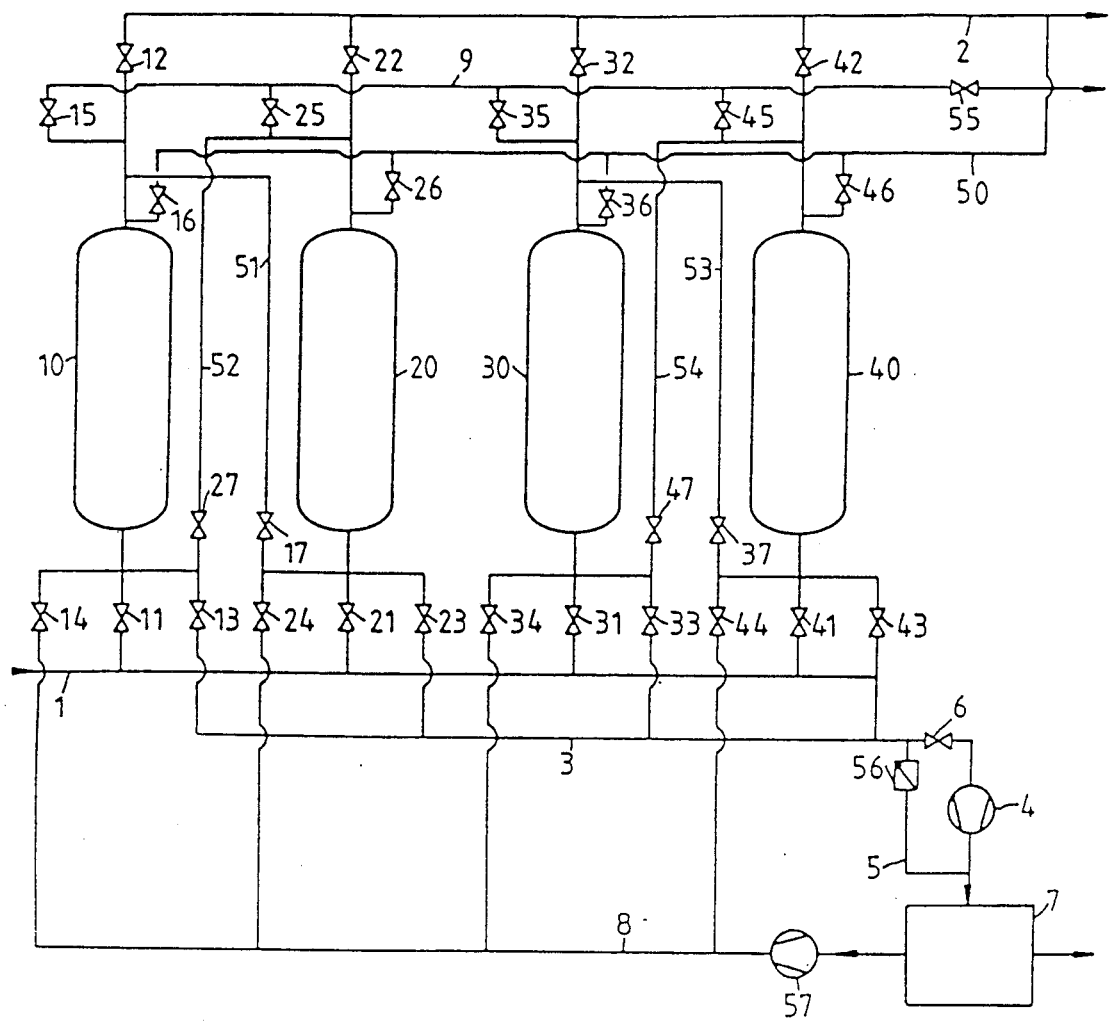
FIG. 1 is an adsorption facility for performing the process of this invention and FIG. 2 is a cycle chart for the operation of the adsorption facility shown in FIG. 1.

The adsorption facility illustrated in FIG. 1 comprises four adsorbers 10, 20, 30, 40. The number of adsorbers utilized depends primarily on the quantity of gas to be processed, two adsorbers being the minimum. In the case of very large amounts of gas more than four adsorbers, for example eight or even more adsorbers can be employed. The adsorbers are connected on their inlet side, via valves 11, 21, 31 and 41, respectively, to a supply conduit 1 for gaseous mixture to be separated. The adsorber outlet side is correspondingly connected via valves 12, 22, 32 and, respectively, 42 to a discharge conduit 2 for unadsorbed gas. Furthermore, the adsorber inlet ends are in communication, via valves 13, 23, 33 and 43, respectively, with a product gas conduit 3 for desorbed components. Conduit 3 leads via valve 6 and a vacuum pump 4, or in a bypass thereto via a conduit 5 with a check valve 56, to a product storage tank 7 from which a portion of the product can be returned via the blower 57 and conduit 8 to the adsorber inlet ends by way of valves 14, 24, 34 and 44. The adsorber outlet ends are also connected via valves 15, 25, 35 and 45 to a conduit 9 utilized for withdrawing unadsorbable components during an initial loading phase. Also, the adsorber outlet ends are additionally connected by way of valves 16, 26, 36 and 46 to a conduit 50 branching off from conduit 2. Finally, the outlet ends of the adsorbers 10 and 20 are connected crosswise to the inlet ends of adsorbers 20 and 10, respectively by way of conduits 51 and 52 with valves 17 and 27. In a corresponding way, the outlet ends of the adsorbers 30 and 40 are connected crosswise to the inlet ends of the adsorbers 40 and 30, respectively, via conduits 53 and 54 with valves 37 and 47.

The operation of the adsorption installation illustrated in FIG. 1 will be explained in greater detail, using the cycle chart shown in FIG. 2.

During an adsorption phase A, taking place, for example, in adsorber 10, the gaseous mixture to be separated is conducted via conduit 1 and the opened valve 11 into adsorber 10 and separated therein. The unadsorbed components leave the adsorber via the opened valve 12 and are withdrawn by way of conduit 2 essentially at a constant adsorption pressure which corresponds, except for the pressure losses, to the pressure of the gaseous mixture to be separated. During adsorption phase A, the valves 13, 14, 15, 16 and 17 associated with adsorber 10 are closed.

After the completion of an adsorption phase A, valves 11 and 12 are closed and the adsorber, in order to remove some of the void gas in the adsorber prior to desorption, is first expanded to an intermediate pressure corresponding approximately to the partial pressure of the component in the gaseous mixture which is to be adsorbed. For this purpose, valve 17 is opened and expansion gas consisting essentially of unadsorbable component is introduced via conduit 51 to the inlet end of adsorber 20 presently passing through a second repressurization phase R1. The expansion phase E of adsorber 10 is terminated at the latest upon reaching the partial pressure of the adsorbable component in order to avoid losses by desorption of the adsorbable component.

After termination of the expansion phase, the unadsorbable components still contained in adsorber 10 are purged by product gas which is withdrawn via conduit 8 from the product storage tank 7. During this purging phase P, product gas enters via the opened valve 14 into the inlet end of the adsorber 10 and displaces unadsorbable components (void gas) remaining in adsorber 10; these components are fed into adsorber 20 via conduit 51 and the still opened valve 17. The recycling of the gas exiting from adsorber 10 during this purging phase P into the adsorber 20 takes place in order to recover adsorbable components present in this gas; this is accomplished by the initial loading PR (purge recycle) of adsorber 20. During this PR phase, the valve 25 at the outlet end of adsorber 20 is opened after the purging pressure has been reached so that unadsorbable components can be discharged from the installation via conduit 9 and the opened valve 55. After the adsorber 10 has been saturated with adsorbable components, valves 14, 17, 25 and 55 are closed.

After the PR phase, the adsorbable component can be obtained in pure form from adsorber 10. For this purpose, the pressure in the adsorber is first reduced to approximately atmospheric pressure. During this desorption phase D, product gas enters the product storage tank 7 by way of the opened valve 13 via conduit 3, check valve 56 and conduit 5, valve 6 being closed. After the pressure in adsorber 10 has dropped to about atmospheric pressure, valve 6 is opened and the adsorber 10 is evacuated by way of the vacuum pump 4. This vacuum desorption phase V is continued until adsorber 10 has been adequately regenerated, generally terminating at a pressure of between 0.03 and 0.3 bar, preferably at a pressure of between 0.1 and 0.2 bar.

After termination of the vacuum desorption V, valve 13 is closed and the presently regenerated adsorber 10 can be repressurized to adsorption pressure before another adsorption phase A is performed. For this purpose, in phase RN, unadsorbed gas from conduit 2 (or in the alternative, a foreign unadsorbable gas via another conduit, as shown in the drawing of German priority application P 35 16 981.1) is first introduced via conduit 50 and the opened valve 16 connected to the outlet end of the adsorber 10, to repressurize the adsorbent to an intermediate pressure of between 0.1 and 1 bar.

After completing the RN phase, valve 16 is closed, and an additional pressure buildup R1 is effected via the opened valve 27 and conduit 52 with expansion gas from adsorber 20 which has previously completed an adsorption phase. This repressurization phase R1 is terminated once the adsorber 20, yielding the expansion gas utilized for the pressure buildup, has dropped to a pressure of approximately the partial pressure of the adsorbable component in the gaseous mixture. Then, valve 24 is open and adsorber 10 is initially loaded with gas discharged from adsorber 20 during a purging phase P. This takes place via conduit 52 and the opened valve 27. The gas exiting from adsorber 10 during the initial loading phase PR is discharged via the opened valve 15, conduit 9, and the valve 55 which is likewise opened in this phase. The initial loading phase PR is ended after the unadsorbable components have been purged from adsorber 20 during purging phase P. Then, valves 27 and 15 are closed and adsorber 10 is pressurized from the intermediate pressure at which initial loading PR takes place, to the adsorption pressure during a pressure buildup phase RO. The pressure buildup phase RO takes place by introducing gaseous mixture to be separated via the opened valve 11. Once the adsorption pressure has been reached, the outlet valve 12 is opened, and a new adsorption phase A is initiated, thus starting a new cycle.

Figure 2:
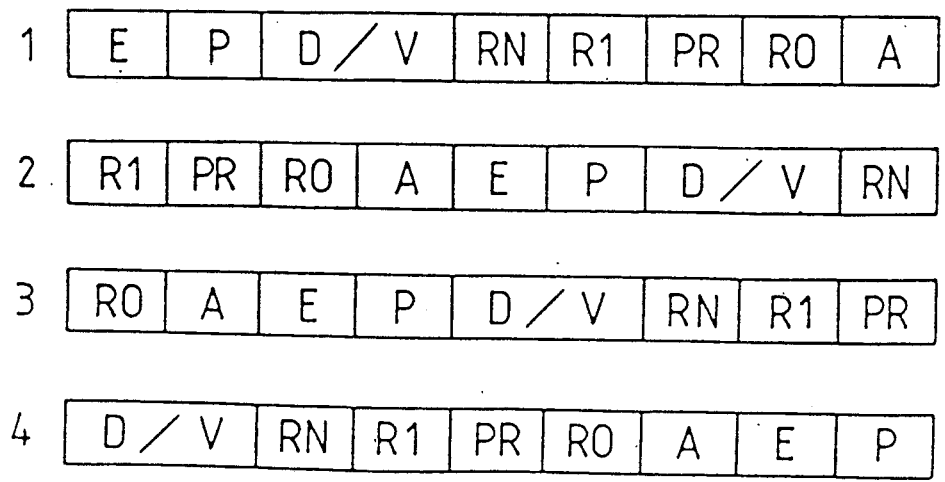

The remaining adsorbers are operated in a corresponding fashion, the mutual displacement of the switching cycles being apparent from the cycle chart illustrated in FIG. 2.

Without further elaboration, it is believed that one skilled in the art can, using the preceding description, utilize the present invention to its fullest extent. The following example is to be construed as merely illustrative, and not limitative of the remainder of the disclosure in any way whatsoever.

EXAMPLE 1

According to the process described in the figures, a gaseous mixture made up of 70 vol-% CO and 30 vol-% $N_2$ was separated. After evacuation, the pressure in the adsorber was 0.1 bar. During step RN, the pressure of 0.1 bar was raised to 0.25 bar. With a product purity of 98 mol% CO, a yield of CO pf 97.5% was obtained in the process of this invention. Without step RN, as compared therewith, a yield of merely 89% was achieved, the first pressure buildup taking place by pressure equalization with another adsorber. With a product purity of 95 mol% CO, a yield of CO of 98.2% was attained in the process of this invention, whereas, without step RN, merely 91.4% of the CO contained in the crude gas could be obtained as the product.

In this special embodiment we used an adsorption pressure of 3.05 bar with the corresponding partial pressure of the strongly adsorbable component during adsorption being 2.1 bar. The pressures at the end of each step were as following:

Step A: 3.05 bar
E: 2.1 bar
P: 2.1 bar
D: 1.0 bar
V: 0.1 bar
RF: 0.25 bar
R1: 0.65 bar
RO: 3.05 bar All patents, applications for patents and publication mentioned above are incorporated by reference herein.

The preceding example can be repeated with similar success by substituting the generically or specifically described gases and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure swing adsorption process for the separation of a gaseous mixture containing at least two components having different adsorbabilities, said process comprising passing the gaseous mixture in an adsorption phase through an adsorber so as to adsorb the more adsorbable component; purging residual less adsorbable component remaining in the adsorber after the adsorption phase by passing into the adsorber a gas consisting essentially of the more adsorbable component; recovering the more adsorbable component by drawing a vacuum on the adsorber; and repressurizing the adsorber to adsorption pressure, the improvement comprising repressurizing the adsorber in a four-phase step comprising a first pressure build-up phase wherein the adsorber is repressurized to an intermediate pressure with a weakly adsorbable gas, said weakly adsorbable gas being unadsorbed gas withdrawn from an adsorber during the adsorption phase; a second pressure build-up phase wherein expansion gas from another adsorber is introduced into the adsorber; a third pressure build-up phase wherein exit purge gas from another adsorber is introduced into the adsorber and a fourth pressure build-up phase wherein the gaseous mixture to be treated is introduced into the adsorber.

2. A process according to claim 1, wherein the vacuum recovery step is conducted at 0.03-0.3 bar and the intermediate pressure is 0.1-1 bar.

3. A process according to claim 2, wherein the gaseous mixture contains 40-75 mol% of the more adsorbable component.

4. A process according to claim 3, further comprising, after termination of an adsorption phase, expanding the adsorber to a pressure not less than the partial pressure of the more adsorbable component in the gaseous mixture to be separated; and passing resultant expansion gas exiting from the adsorber to a previously regenerated adsorber to repressurize the latter after it has been subjected to said first pressure buildup phase.

5. A process according to claim 4, further comprising recovering an exit purge gas obtained by said purging of the adsorber with gas consisting essentially of more adsorbable components, and introducing said exit purge gas into another, previously regenerated adsorber after said regenerated adsorber has been repressurized with expansion gas.

6. A process according to claim 3, further comprising recovering an exit purge gas obtained by said purging of the adsorber with gas consisting essentially of more adsorbable components, and introducing said exit purge gas into another, previously regenerated adsorber.

7. A process according to claim 2, wherein the gaseous mixture contains 50-70 mol% of the more adsorbable component.

8. A process according to claim 2, wherein the intermediate pressure is 0.1-0.5 bar.

9. A process according to claim 8, wherein the adsorption phase is performed under a pressure of 1.5-3 bar.

10. A process according to claim 2, wherein the adsorption phase is performed under a pressure of 1-5 bar.

11. A process according to claim 1, wherein the gaseous mixture contains 40-75 mol% of the more adsorbable component.

12. A process according to claim 11, wherein the intermediate pressure is 0.1-0.5 bar.

13. A process according to claim 1, further comprising, after termination of an adsorption phase, expanding the adsorber to a pressure not less than the partial pressure of the more adsorbable component in the gaseous mixture to be separated; and passing resultant expansion gas exiting from the adsorber to a previously regenerated adsorber to repressurize the latter after it has been subjected to said first pressure buildup phase.

14. A process according to claim 13, further comprising recovering an exit purge gas obtained by said purging of the adsorber with gas consisting essentially of more adsorbable components, and introducing said exit purge gas into another, previously regenerated adsorber after said regenerated adsorber has been repressurized with expansion gas.

15. A process according to claim 1, further comprising recovering an exit purge gas obtained by said purging of the adsorber with gas consisting essentially of more adsorbable components, and introducing said exit purge gas into another, previously regenerated adsorber.

16. A process according to claim 1, wherein the pressure achieved in the adsorber during the vacuum recovery step is 0.1-0.2 bar.

17. A process according to claim 1, wherein the gaseous mixture comprises carbon monoxide, nitrogen and hydrogen, and the more adsorbable component is carbon monoxide.

18. A process according to claim 17, wherein said weakly adsorbable gas is nitrogen, hydrogen or argon.

19. A process according to claim 1, wherein, prior to the vacuum recovery step, the adsorber undergoes a desorption phase wherein the pressure in the adsorber is reduced to about atmospheric pressure and the product gas exiting the adsorber is delivered to a product storage tank.

20. A process according to claim 1, wherein said more adsorbable component is the most adsorbable component of said gaseous mixture.

* * * * *